Aug. 26, 1958 R. L. KOEHLER 2,849,538

AUTOMATIC PARTY IDENTIFIER SYSTEM

Filed Aug. 8, 1955 2 Sheets-Sheet 1

INVENTOR.
ROBERT L. KOEHLER
BY Ival R. Goshaw
ATTORNEY

INVENTOR.
ROBERT L. KOEHLER
BY [signature]
ATTORNEY

United States Patent Office 2,849,538

Patented Aug. 26, 1958

2,849,538

AUTOMATIC PARTY IDENTIFIER SYSTEM

Robert L. Koehler, Canoga Park, Calif., assignor to Ralph D. Collins, Beverly Hills, Calif.

Application August 8, 1955, Serial No. 527,113

8 Claims. (Cl. 179—17)

This invention relates to communication apparatus, such as telephones, and particularly to a telephone subscriber identification system whereby the calling subscriber's subset will be identified at a central station.

The use of different systems for identifying subscribers' subsets are known, as evidenced by U. S. Patents No. 2,672,518 and No. 2,387,897, a vibrator unit for generating identifying signal tones being shown in U. S. Patent No. 2,254,378. The present invention is an improvement and has several advantages over prior identification systems. It is also an improvement over U. S. application, Serial No. 439,007, filed June 24, 1954, by R. D. Collins, to whom this application is assigned. First, when the operator uses manual identification, it is not positive, is costly, and is subject to wrong numbers. Other system, such as a non-coded grounded system, are limited to two-party identification, are subject to bad ground connections, and require proper poling. The coded ground systems are also subject to bad ground conditions, are not of universal application, require more elaborate test equipment, and a de-centralized test center.

The system of this invention requires no grounds, there is no practical limitation to the number of parties, it will operate with all present-day line equipment and over conventional line facilities, will provide positive identification for individual and party lines, requires no mechanical adjustment beyond normal maintenance, will permit centralized testing, and requires no poling. Wherein the Collins' application above mentioned utilizes a transistor oscillator tuned to a specific frequency, or a tuned standard transformer circuit which is shock-excited to provide the identification current in the form of a damped wave, my invention utilizes a simplified tuned autotransformer, shock-excited oscillator, or a split capacity shock-excited oscillator. It has been found that not only are these types of shock-excited oscillators extremely compact so as to be accommodated in present-day subset housings, but the provide particularly dependable means for obtaining the identifying signal, in that the system employs a simple inert or passive network for the generation of the oscillations.

The principal object of the invention, therefore, is to facilitate the identification of subscribers' stations, or subsets, of a telephone system in an extremely simple and economical manner.

Another object of the invention is to provide an improved system of identification of telephone subscribers' stations or subsets.

A further object of the invention is to provide improved systems of generating identification signals at a telephone subscriber's station or subset.

A still further object of the invention is to provide a compact and dependable shock-excited oscillator using an autotransformer or a divided capacitor arrangement which simplifies the means of obtaining impedance matching between the oscillator and the line.

The novel features which are believed to be characteristic of this invention, both as to the manner of its organization and the mode of its operation, will be better understood from the following description, when read in conjunction with the accompanying drawings, in which.

Figure 1:
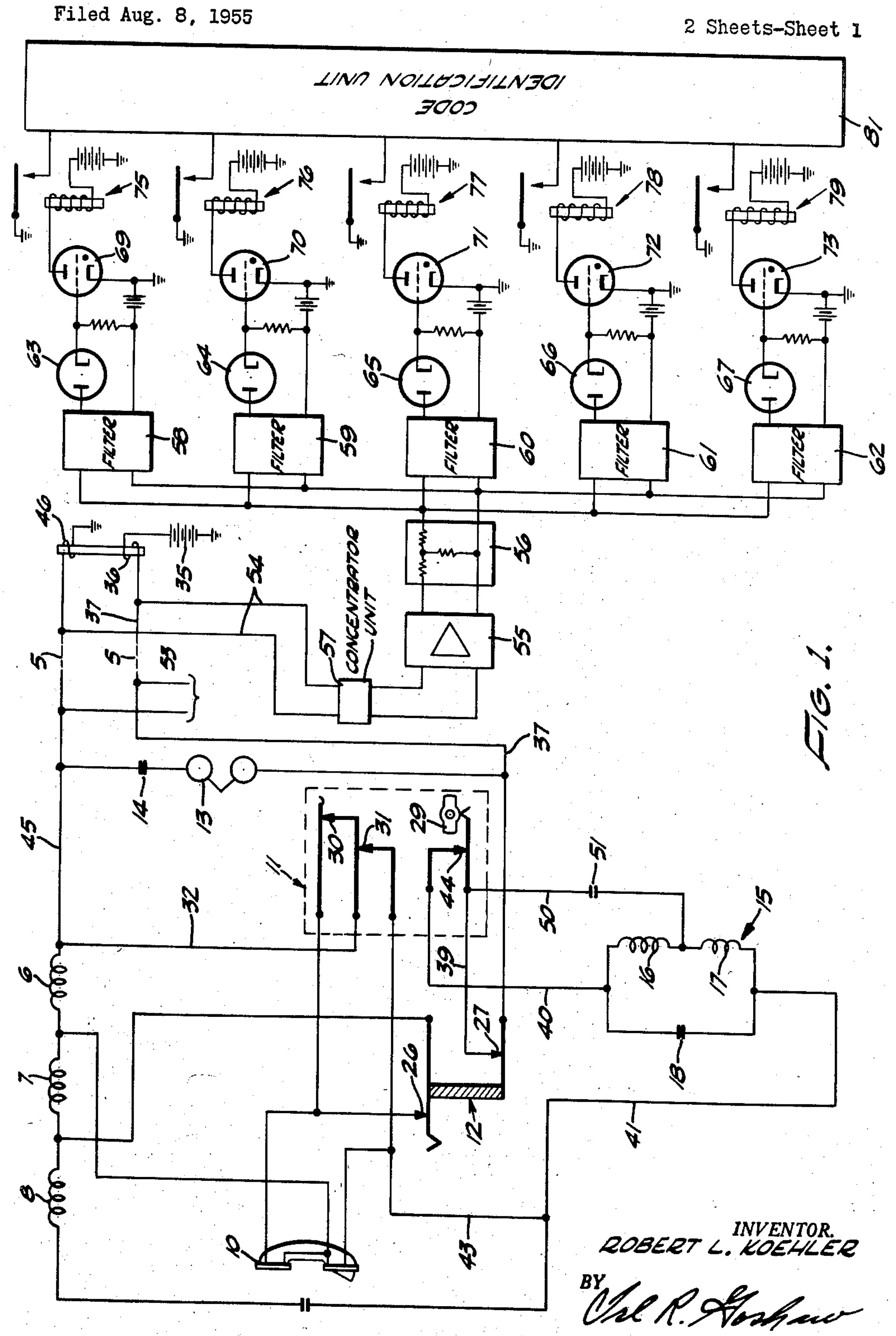
Fig. 1 is a combination schematic and diagrammatic drawing of a system embodying the invention.

Referring now to the drawings, and particularly to Fig. 1, a subscriber's station or subset is shown to the left of the broken lines 5, these lines indicating various distances of separation between the subset and the central station equipment, a portion of which is shown to the right of the broken lines 5. The subset includes a standard induction coil having three sections 6, 7, and 8, a standard transmitter-receiver unit 10, a standard dialing unit shown within the broken lines 11, a standard hook switch 12, and a standard bell ringer 13 with its blocking condenser 14. An addition to this standard subset is a shock-excited oscillator 15 composed of windings 16 and 17 of an autotransformer, and a condenser 18.

As mentioned above, the purpose of the invention is to generate a signal at a telephone subset for transmission to a telephone central office which will identify the subset. The signal is generated by the oscillator 15 when energized by the normal action of a calling subscriber, the oscillator being tuned to provide a damped wave of a certain predetermined frequency, each subset on a party line being tuned to a different frequency. When a subscriber removes the unit 10 from the hook switch 12, contacts 26 and 27 are made. Now, when the dial is actuated to call a number, a cam 29 is rotated to open contacts 44 and contacts 30 and 31 are made. Thus, a direct current potential is impressed on the oscillator 15 from the central office when contacts 44 are closed.

The direct current energizing circuit for the oscillator from the central office is over a battery 35, pulsing relay winding 36, conductor 37, contacts 27, conductor 39, contacts 44, conductor 40, through windings 16 and 17, and over condenser 18, conductor 41, conductor 43, contacts 31, conductor 32, conductor 45, and winding 46 of the pulsing relay to ground.

Excitation of the oscillator is supplied when the dial is moved off normal through the circuit just traced. Now, when the dial is released at the finger stop, the dial cam 29 is caused to rotate which alternately opens and closes contact 44 in accordance with the position of the cam 29. When contacts 44 are opened, a damped oscillation is estblished in the parallel resonant circuit of the autotransformer 16—17, the frequency of which is determined by the inductance of the coils or windings 16 and 17 and the capacitance of the condenser 18. Windings 16 and 17 form an autotransformer to facilitate matching the high source impedance of the parallel resonant circuit to the lower impedance of the transmission line. Winding 17 and condenser 18 form the output circuit of the oscillator and signal power is transmitted over a circuit including conductor 37, contacts 27, conductor 39, conductor 50, condenser 51, conductor 41, conductor 43, contacts 31, conductor 32, and conductor 45.

Referring now to the remaining portion of the circuit, conductors 53 indicate the connection of other subscribers circuits to the line 37 and 45, to which is connected over conductors 54 at the central station, a concentrator unit 57, a limiting amplifier 55, and an attenuation pad 56. To the output of the pad is connected a plurality of filters 58, 59, 60, 61 and 62, five being shown for purposes of illustration. Each filter is tuned to correspond to the tuning of a damped oscillator unit, such as 15, at the respective subscriber stations. That is, filter 58 would be tuned to the frequency of the damped wave generated by the oscillator 15 while the other filters would be respectively tuned to the frequency of the other oscillators.

The output of each filter is connected to respective rectifiers 63, 64, 65, 66, and 67, which are followed by respective thyratrons 69, 70, 71, 72, and 73, with their respective bias batteries and grounds. The thyratrons are connected to respective relays 75, 76, 77, 78, and 79, which are then connected to a conventional type of relay code identification unit 81 which functions in a normal manner to provide identification data at the central office.

As mentioned above, the oscillator may be of very small size, suitable for inclusion within a subset casing, and since an alternating current tone is generated in the loop, no grounds are required, poling is unnecessary, and the unit will operate with present-day line equipment. Since the oscillators require no mechanical adjustments, and contain no active elements, such as vacuum tubes, etc., only minor maintenance is required. It is to be understood, of course, that the identification tone frequencies would normally lie within the voice frequency band, inasmuch as they are transmitted only during the dialing operation when the dialing contacts 44 are broken, contacts 31 being maintained closed during the dialing operation. When the dialing is completed, contacts 44 are closed, which short circuits the output of oscillator 15 during conversation. When the unit 10 is replaced on switch hook 12, contacts 27 are broken and the oscillator 15 is de-energized. Contacts 30 and 31 are also open when the dial is in normal position which opens the circuit to the oscillator.

The identification signal is impressed on the concentrator 57, which reduces the number of receivers required, and then on limiting amplifier 55, which serves to compensate for differences in received signal power caused by the extreme differences in lengths and grades of transmission lines and to reduce the interference effects of transients when the signals start and stop and when the field collapses around the windings 36 and 46 of the pulsing relay. The pad functions to further reduce transient response by the channel filters. As the signal is received, it will pass through the filter tuned to it, will fire the respective thyratron by overcoming the negative bias of the polarizing batteries thereof and thus energize its respective relay. The signal is then received on the coded identification unit and an identification is automatically made.

Figure 3:
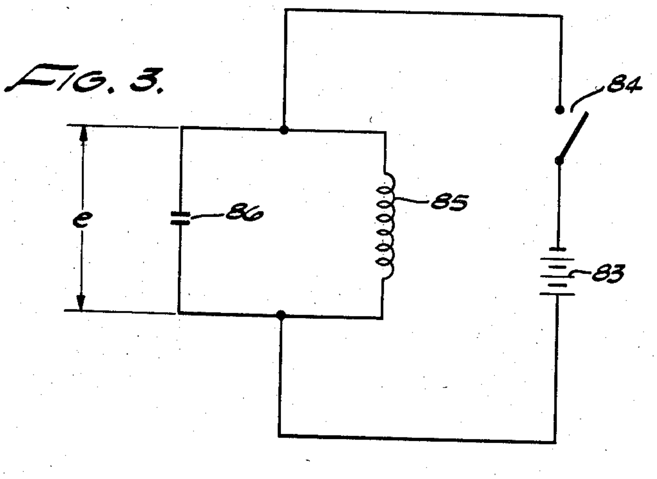
Fig. 3 is a schematic view illustrating the principle of a shock-excited oscillator.
Figure 4:
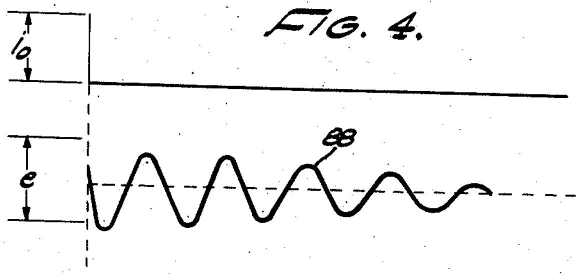
Fig. 4 is a graph showing the operation of a shock-excited oscillator.

To explain the generation of the identifying signal, reference is made to Figs. 3 and 4, Fig. 3 showing a battery source 83 in circuit with a switch 84, and an inductance 85 in parallel with a condenser 86. It is well known that the closing of the switch 84 will cause a current $i_0$ to flow through the inductance 85, the relationship between this current $i_0$ and alternating current voltage $e$ being shown in the graph in Fig. 4. Now, upon the opening of switch 84, the energy in coil 85 will charge condenser 86, which energy will then be discharged through coil 85, and a damped wave train, such as shown in 88 in Fig. 4, will result.

The tuning of the oscillator circuit 15 by the inductances of windings 16 and 17 and the capacitance of condenser 18 will provide any desired frequency of the damped wave identifying signal. The circuit has a small loss or high "Q" so that the oscillations do not decay too rapidly. The period of the oscillations "T" is a reciprocal of the usual expression for frequency in an undamped L—C circuit and is as follows:

$$T=2\pi\sqrt{LC}$$

Now since all of the energy stored in the magnetic field of the windings 16 and 17 is changed to energy in the electrical field of the condenser 18 at the time the first peak $e$ is formed, the magnitude of this peak is obtainable from the energy relation $$\tfrac{1}{2}Li_0^2 \text{ or } \tfrac{1}{2}Ce_0^2$$

where:

$i_0$=the initial current in the inductance L, and $e_0$=the magnitude of the first wave peak $e$.

Figure 2:
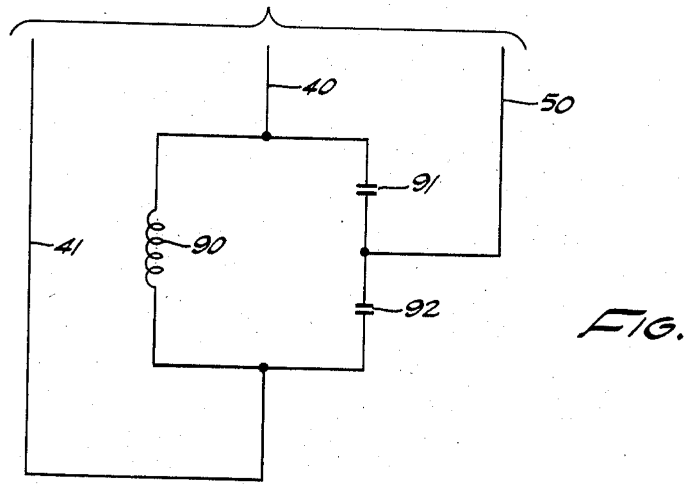
Fig. 2 is a detailed view of the modification of the identifying signal generator shown in Fig. 1.

Referring now to Fig. 2, a modification of the oscillator circuit 15 is shown, which consists of a single inductance 90 and two condensers 91 and 92. This circuit accomplishes the same results as the oscillator 15 shown in Fig. 1, but differs in that a tapped condenser arrangement is employed in lieu of the tapped inductance or autotransformer 16—17. Series condensers 91 and 92 in parallel with inductance 90 form a parallel resonant circuit. Impedance matching is accomplished by means of the capacitance ratio of condensers 91 and 92. The frequency of oscillation is a function of the circuit parameters of the condensers and inductance and can be expressed as $$W=\sqrt{\frac{1}{LC}}$$

where W is $2\pi f$ cycles per second.

With the inert oscillators above described, sufficient identifying signal tone is generated at each subset to provide its identification at the central office. The oscillator units occupy a very small space and can thus be easily accommodated within the present-day subscriber's subset. The same oscillator units at the subsets can also be used to transmit signals through telephone system trunk circuits, repeaters, or other telephone system switching elements requiring identification.

I claim:

1. In a telephone subscriber's identification system, the combination of a telephone subset having switch hook contacts and multiple dialing contacts, central office equipment including a plurality of filters for separating currents of different frequencies transmitted thereto, an autotransformer damped wave oscillator located at said subset, and circuit connections between said central station and said oscillator and through said switch hook contacts when closed for impressing an excitation potential on said oscillator for generating a damped alternating current tone, and circuit connections through said switch hook contacts and said dialing contacts for transmitting said tone to said central office equipment.

2. A telephone subscriber's identification system in accordance with claim 1, in which one of said dialing contacts intermittently short circuits said last mentioned connections, the output of said oscillator being transmitted to said central equipment when said contacts are open.

3. A telephone subscriber's identification system comprising a plurality of subsets, central office equipment, a common transmission line between said subsets and said central office equipment, a shock-excited inductance-capacity damped wave oscillator at each of said subsets, each of said oscillators being tuned to generate alternating currents of different frequencies, transmitter-receiver units at each of said subsets, switch hooks for said units, said switch hooks having contacts adapted to be closed by the removal of said transmitter-receiver units, circuit connections through said closed contacts for impressing energy from said central office equipment on each of said respective oscillators over said common transmission line, a dialing unit at each of said subsets, each of said dialing units having multiple contacts, one of which is adapted to be opened and closed during the dialing operation, an output circuit from each of said oscillators through said respective switch hook contacts, transmission of said generated currents occurring during the time said respective dialing contacts are open, connections between the output circuits of each of said oscillators and said common transmission line, and a plurality of filters in said central office equipment for selecting the current generated by each of said oscillators in accordance with the frequency thereof, said oscillators being tuned autotransformer oscillators forming a passive network.

4. A telephone subscriber's identification system comprising a plurality of subsets, central office equipment, a common transmission line between said subsets and said central office equipment, a shock-excited inductance-capacity damped wave oscillator at each of said subsets, each of said oscillators being tuned to generate alternating currents of different frequencies, transmitter-receiver units at each of said subsets, switch hooks for said units, said switch hooks having contacts adapted to be closed by the removal of said transmitter-receiver units, circuit connections through said closed contacts for impressing energy from said central office equipment on each of said respective oscillators over said common transmission line, a dialing unit at each of said subsets, each of said dailing units having multiple contacts, one of which is adapted to be opened and closed during the dialing operation, an output circuit from each of said oscillators through said respective switch hook contacts, transmission of said generated currents occurring during the time said respective dialing contacts are open, connections between the output circuits of each of said oscillators and said common transmission line, and a plurality of filters in said central office equipment for selecting the current generated by each of said oscillators in accordance with the frequency thereof, said oscillator being a shock-excited oscillator including autotransformer windings shunted by a condenser forming a passive network.

5. A telephone subscriber's identification system comprising a subset including a switch hook having contacts and a dialing unit having multiple dialing contacts, an autotransformer having tuned windings for generating a current of a predetermined frequency, a source of direct current, connections from said source through closed dialing contacts of said dialing unit for impressing a voltage on said tuned windings, and connections between said windings and said source through said switch hook contacts when closed.

6. A telephone subscriber's identification system comprising a subset having switch hook contacts, a dialing unit having multiple dialing contacts, a shock-excited inert inductance-capacity damped wave alternating current generator, a source of direct current, connections from said source through said dialing contacts when closed for impressing a voltage on said generator, and connections from said generator to said first-mentioned connections through said switch hook contacts when closed, said alternating current generator being a passive network including an autotransformer shunted by a condenser.

7. A telephone subscriber's identification system comprising a subset having switch hook contacts, a dialing unit having multiple dialing contacts, a shock-excited inert inductance-capacity damped wave alternating current generator, a source of direct current, connections from said source through said dialing contacts when closed for impressing a voltage on said generator, and connections from said generator to said first-mentioned connections through said switch hook contacts when closed, said alternating current generator being a passive network including a pair of condensers in series shunted by an inductance.

8. A telephone subscriber's identification system comprising a subset including a switch hook having contacts and a dialing unit having multiple dialing contacts, a source of direct current potential, an autotransformer having windings with a certain inductance, and a condenser for tuning said windings-condenser combination to generate a damped current of a certain frequency when shock excited by the potential from said source, said potential being impressed on said windings-condenser combination through said switch contacts and certain of said dialing contacts when closed, said current of said frequency identifying said subset.

References Cited in the file of this patent

UNITED STATES PATENTS

| | | |
|---|---|---|
| 1,857,827 | Stacy | May 10, 1932 |
| 1,864,082 | Massonneaux | June 21, 1932 |
| 1,864,524 | Bragg | June 28, 1932 |
| 2,277,228 | Hecht | Mar. 24, 1942 |
| 2,283,610 | Mohr | May 19, 1942 |